Jan. 7, 1930.　　　　F. PERRETTI　　　　1,743,001
CLOCK ACTUATING MECHANISM
Filed May 6, 1927　　5 Sheets-Sheet 1
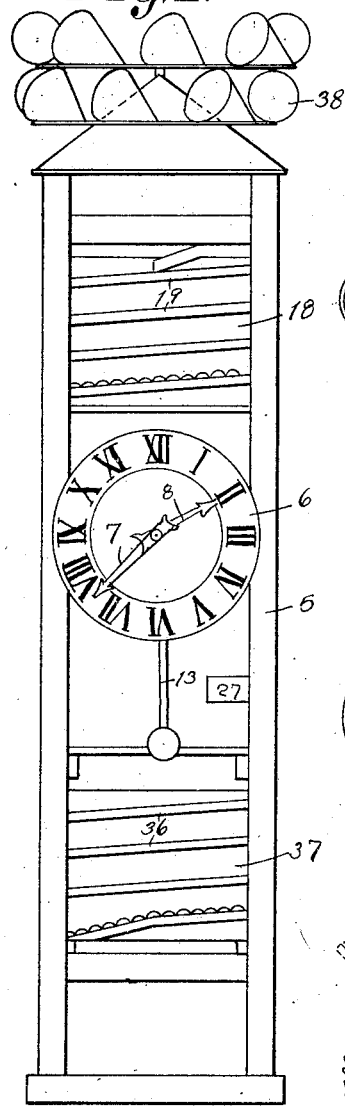
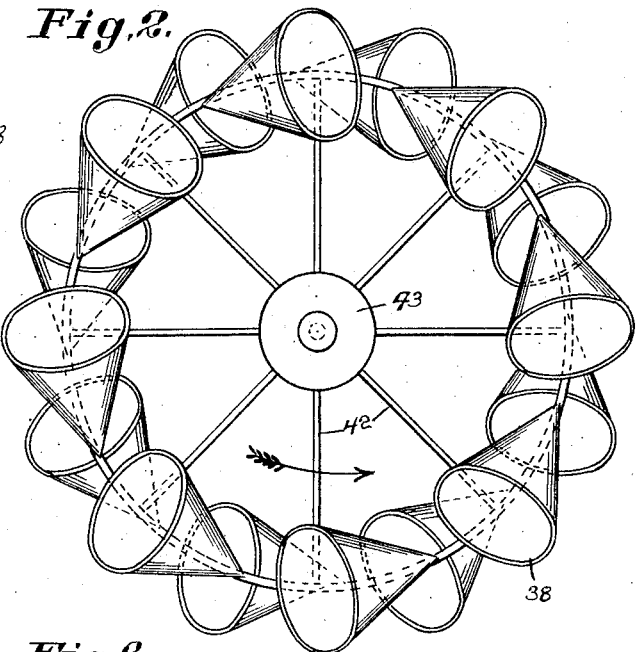
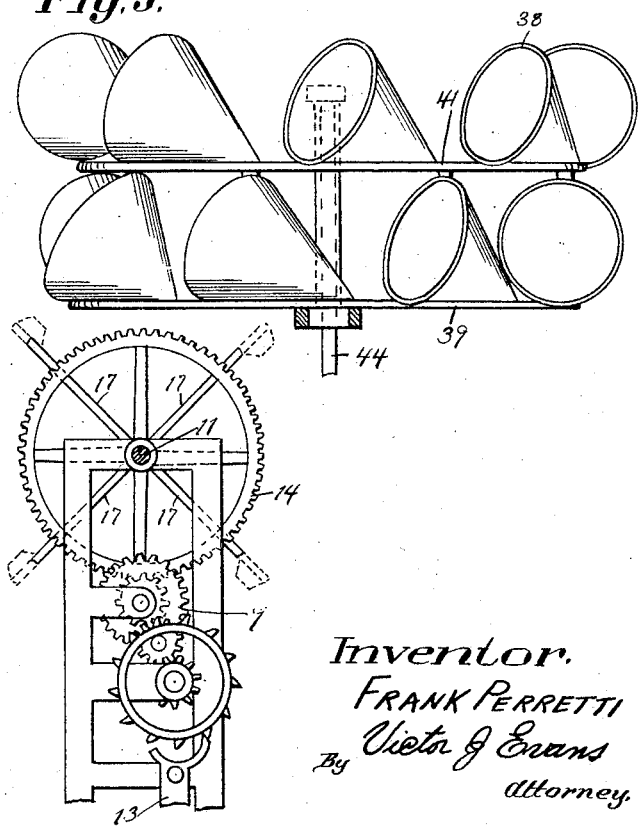
Inventor.
FRANK PERRETTI
By Victor J Evans
Attorney.

Jan. 7, 1930.  F. PERRETTI  1,743,001
CLOCK ACTUATING MECHANISM
Filed May 6, 1927   5 Sheets-Sheet 2

Inventor.
FRANK PERRETTI
By Victor J. Evans
Attorney

Jan. 7, 1930.  F. PERRETTI  1,743,001
CLOCK ACTUATING MECHANISM
Filed May 6, 1927  5 Sheets-Sheet 3

Inventor,
FRANK PERRETTI
By Victor J. Evans
Attorney.

Jan. 7, 1930.  F. PERRETTI  1,743,001
CLOCK ACTUATING MECHANISM
Filed May 6, 1927   5 Sheets-Sheet 4
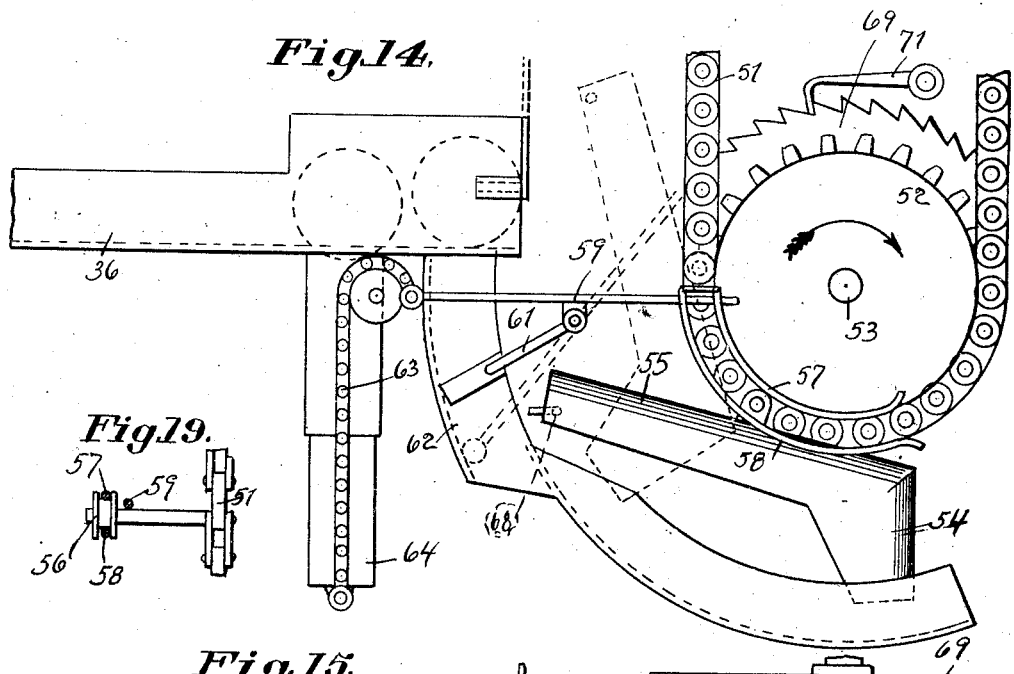
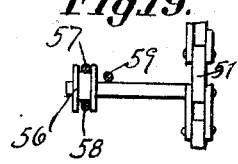
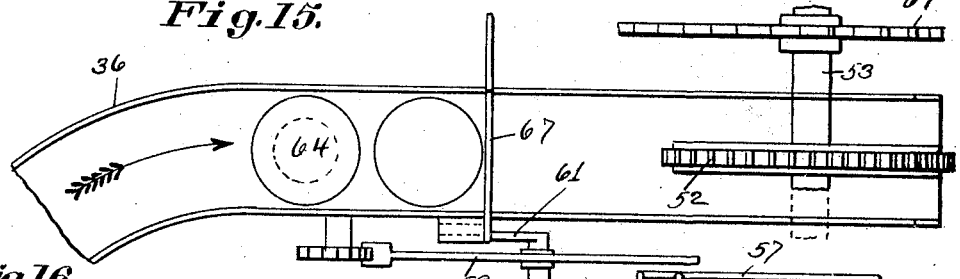
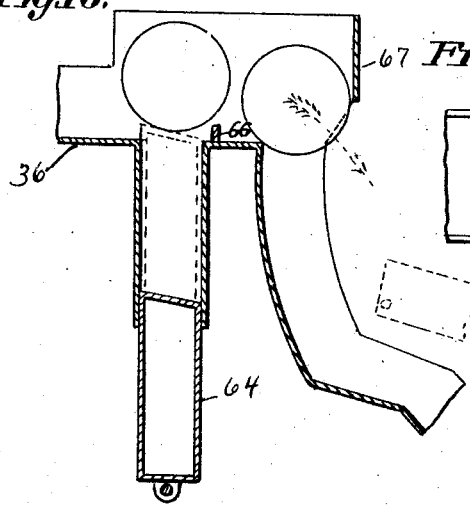
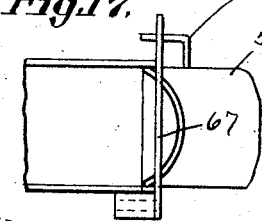
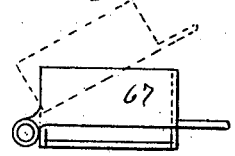
Inventor,
FRANK PERRETTI
By Victor J. Evans
Attorney.

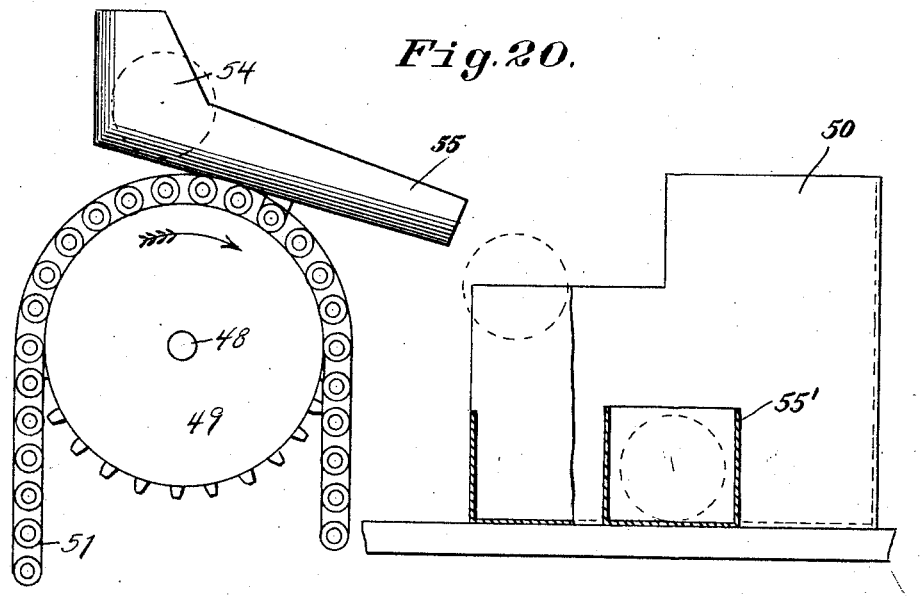
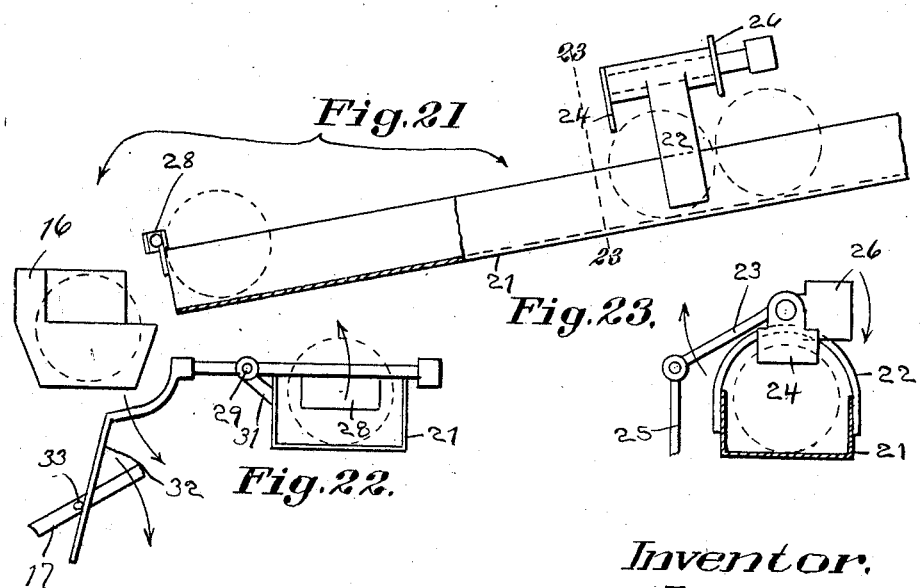

Patented Jan. 7, 1930

1,743,001

UNITED STATES PATENT OFFICE

FRANK PERRETTI, OF SAN FRANCISCO, CALIFORNIA

CLOCK ACTUATING MECHANISM

Application filed May 6, 1927. Serial No. 189,369.

This invention relates to improvements in clocks, and has particular reference to a wind actuated clock mechanism.

The principal object of this invention is to produce a clock wherein the wind will serve to keep the clock in constant motion through the raising of a plurality of weights to a point above the clock mechanism.

Another object of this invention is to produce a clock wherein a plurality of weights may be stored for the purpose of operating the clock during a period when there is no wind.

Another object is to produce a clock of this character which is simple in construction and automatic in operation.

Other objects and advantages will be apparent during the course of the following description.

Figure 5:
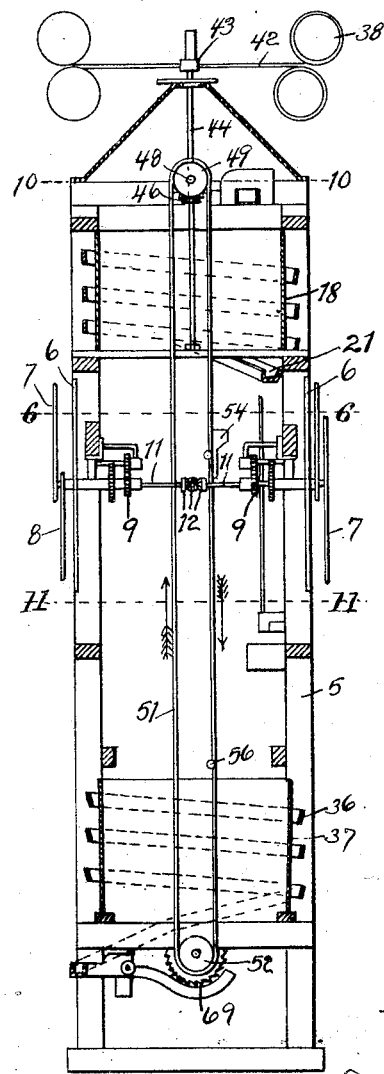
Figure 6:
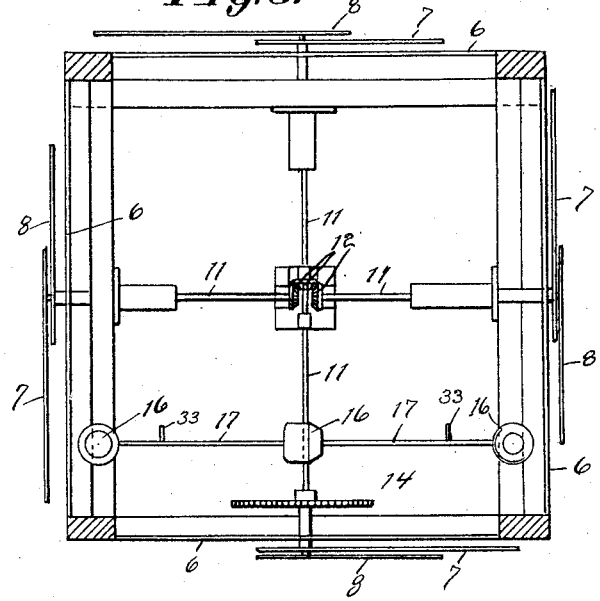
Figure 7:
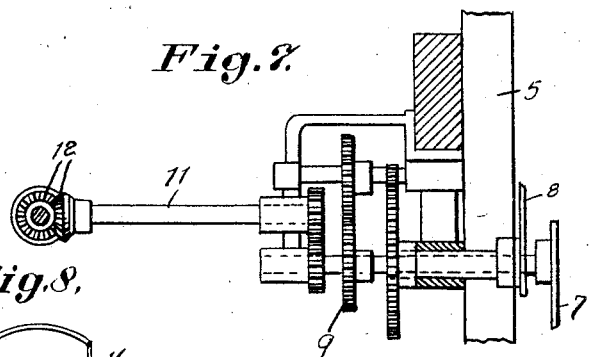
Figure 8:
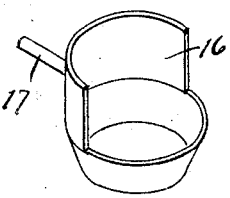
Figure 9:
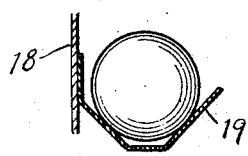
Figure 10:
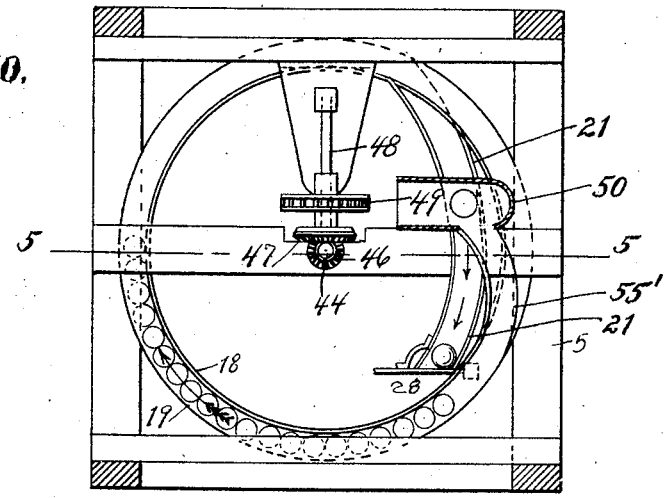
Figure 11:
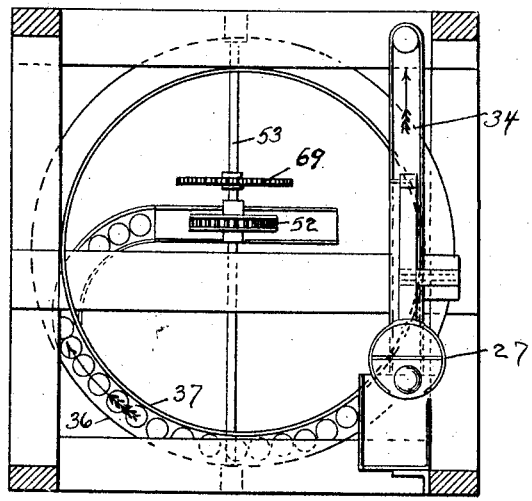
Figure 12:
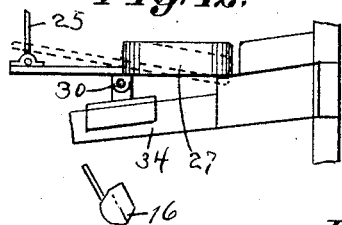
Figure 13:
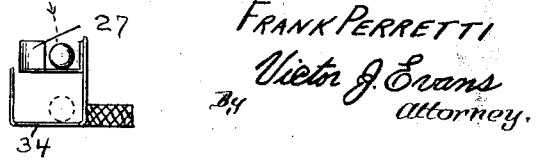

In the accompanying drawings forming a part of this specification, and in which like numerals are employed to designate like parts throughout the same, Figure 1 is a side elevation of my clock, Figure 2 is a top plan view of the wind driving element on an enlarged scale, Figure 3 is a side elevation of Figure 2, Figure 4 is a fragmentary detail view of the clock gear train and weight cups, Figure 5 is a sectional view taken on line 5—5 of Figure 10, Figure 6 is a cross-section taken on the line 6—6 of Figure 5 and on an enlarged scale, Figure 7 is an enlarged fragmentary detail view of the clock gear train, Figure 8 is a detail perspective view of one of the weight cups, Figure 9 is a fragmentary detail view showing the ball raceway, Figure 10 is a cross-sectional view taken on the line 10—10 of Figure 5 and on an enlarged scale, Figure 11 is a similar cross-section taken on the line 11—11 of Figure 5, Figure 12 is a side elevation of the weight receiving cup, Figure 13 is an end elevation of the weight receiving cup, Figure 14 is an enlarged detail view of the weight pick-up mechanism, Figure 15 is a top plan view of Figure 14, Figure 16 is a fragmentary detail view of the weight trip mechanism, Figure 17 is a top plan view of the weight return gate, Figure 18 is a front elevation of Figure 17, Figure 19 is a fragmentary detail view of the chain trip mechanism, Figure 20 is a fragmentary detail view showing the pick-up cup in discharging position, Figure 21 is a side elevation showing the weight releasing mechanism, Figure 22 shows the ball time gate, and Figure 23 is a view taken on the line 23—23 of Figure 21.

Many forms of clock mechanisms have been devised for the purpose of driving a train of clock gears at a uniform speed. In some instances, weights were employed for this purpose, which weights were elevated either by hand or by an electric motor, after which the descending action of the weights serve to drive the clock mechanism. These weights in many instances, were of considerable amount and therefore required a very heavy structure and mechanism in order to carry the same.

I have in my present invention, devised a mechanism whereby relatively small weights serve to perform the driving power for a clock mechanism, which weights are later elevated after performing their function, through a wind driven conveyor mechanism.

By employing a large number of weights, the clock mechanism may be maintained in operation over a considerable period of time, irrespective of whether the wind conveyor is operating or not, with the result that sometime during the period of operation of the clock, the wind driven conveyor will function and return all of the weights to their upper storage position.

In the accompanying drawings wherein for the purpose of illustration is shown a preferred embodiment of my invention, the numeral 5 designates the frame-work of my device which is preferably rectangular and of open construction. Upon this frame I position a plurality of clock faces as shown at 6 in Figure 1. Over these faces, hands 7 and 8 are adapted to move. These hands are shown driven by a gear mechanism indicated as a whole by the numeral 9 which gear mechanism is in turn connected to a shaft 11.

As my clock is designed to have four faces, I therefore have four shafts 11 which are connected through the medium of mitre gears 12. The result is that these shafts will drive in unison. It is true that the shafts will not turn in the same direction but the difference of direction is taken care of by the gear mechanism 9, as will be apparent.

It is of course obvious that hands are provided upon the ends of these shafts, which move over their respective faces of the clock. The customary pendulum is shown in fragment at 13 and governs the speed of rotation of the clock gearing 9.

In order to rotate the shafts 11, I provide a power wheel 14 which is secured to the shaft 11 and meshes with one of the gears 9. This power wheel 14 is driven by weights which are periodically dropped into weight cups 16, there being four in number, mounted upon arms 17 secured to the shaft 11.

In order to periodically place weights within the cups 16, I provide in the upper portion of my clock frame 5, a circular drum 18 upon which is an inclined track 19 within which I position a plurality of steel balls, each of which is of sufficient weight to drive my clock mechanism.

The foremost ball in the inclined track 19 comes to rest adjacent a weight releasing mechanism best illustrated in Figures 21, 22 and 23. This weight releasing mechanism is designed to permit one ball to advance a short distance, so as to drop into the weight receiving cup at the proper time, while holding the rest of the balls ready to be released at predetermined intervals.

By referring to Figure 21, it will be noted that a discharge gate is secured to the runway 21 by a yoke 22 secured thereto and the runway 21 is in reality a continuation of the track 19, as shown in Figure 5. This yoke 22 has pivoted thereto a rocker arm 23 having two dispatcher gates secured thereon at right angles to each other. These gates are designated at 24 and 26. The rocker arm 23 is connected by a link 25 to the ball receiving cup 27, the purpose of which will be later seen.

At the lower end of the runway 21 is a ball time gate 28, pivoted as at 29 to a bracket 31 secured at the side of the runway 21. This gate 28 has an offset lever 32 which is adapted to be struck by a pin 33 carried on the arm 17.

The result of this construction just described is that when the clock is running, as one of the ball cups 16 comes into a position just in front of and slightly below the end of the runway as shown in Figure 21, a pin 33 will engage the offset lever 32 thus raising the ball time gate with the result that the ball contained within the end of the runway will pass into the weight cup adjacent thereto, and thus power will be delivered to the clock gear train.

The cup in descending will eventually reach a position which is illustrated in Figure 13 at which time the ball within the cup 16 will be discharged into the ball receiving cup 27 which is pivoted as at 30 and is in turn connected to the link 25 above mentioned.

The result is that the weight of the ball passing into the cup 27, will transmit motion to the link 25 and actuate the dispatcher gate by rocking the same so that the gate 24 passes out of in front of the ball next in line to be discharged. At the same time the gate 26 moves into the path of the next oncoming ball, thereby preventing its further movement. As soon as the ball which has just been discharged into the cup 27 rolls there out of into the trough 34, the gate will return to its normal position and consequently the gate 24 will return to its normal position, at which time the gate 26 will permit the next succeeding ball to roll into its proper position.

The balls after being discharged from the trough 34 are delivered to a lower storage track 36 which is mounted upon a cylindrical member 37. From the lower end of this track, they are elevated to the upper storage track.

In order to accomplish this elevation I provide a wind driven element consisting of a plurality of cone-shaped members 38 mounted upon rings 39 and 41. These rings are secured to spoke-like members 42 in turn mounted upon a hub 43 which is secured to the shaft 44.

This shaft 44 is vertically disposed and has a gear 46 secured thereto, which gear meshes with a gear 47 mounted upon a horizontally disposed shaft 48. This shaft 48 carries a sprocket 49, over which a conveyor chain 51 passes. The lower end of this conveyor chain passes over a sprocket 52 carried upon a shaft 53 mounted upon the lower portion of the clock frame.

Upon the chain 51, I position a bucket 54 having a discharge lip 55. The purpose of this bucket is to elevate the weights from the lower end of the track 36 and discharge them into the track 19.

In order to accomplish the desired elevation, and assuming that the device is so positioned that the wind can actuate the cone-shaped members 38 thus imparting rotation to the shaft 44, thence through the gears 46 and 47 to the shaft 48, the result will be that the conveyor chain 51 will move as shown by the arrows in Figure 5. The cup 54 will then descend and ascend at a rate of speed, depending upon the speed of the chain, which speed is entirely dependent upon the velocity of the wind actuating the same.

The elevating chain 51 has thereon a trip 56 which trip is adapted to pass between the arms 57 and 58, of a pivoted lever 59. This lever is pivoted to a bracket 61 secured upon the side of a support 62. Secured to the end of the lever 59, is a chain 63 having its opposite ends secured to a plunger 64. The purpose of this plunger is to raise the ball next to be picked up and elevated over a projection 66, so as to then lie against the return gate 67. When in this position, a pin 68 carried upon the bucket 54 will engage the end of the gate 67 and elevate the same as shown in dotted lines in Figure 18.

In order to prevent retrograde movement of the shaft 53, I provide a ratchet 69 and a dog 71, the operation of which is obvious.

Therefore the elevating operation consists in a traveling conveyor chain having a trip 56 which first lifts a ball into a position to be discharged and later an elevating bucket moves into position so as to receive the ball so positioned. The bucket and ball is thereafter elevated and discharged into a ball receiver 50 and discharges to a track section 55′ from which it rolls to the inclined track 19, which is best illustrated in Figure 20.

It will thus be seen that the cycle of operation of my clock consists in storing in an elevated track, a plurality of weight balls which first engage a dispatching gate through which these balls are released one at a time to a ball time gate, from which point they are discharged into weight cups, which are secured to a shaft adapted to drive a clock mechanism.

When the cup 16 has reached a sufficiently low point, the ball contained therein is dropped into a ball receiving cup, the act of which causes the operation of the before mentioned dispatcher gate. The ball just passing through the cycle continues on into a lower storage track, from which point it is held against further movement until the elevating mechanism first moves the ball into a discharging position to be received in an elevating bucket carried upon the conveyor chain.

When the bucket reaches the top of its travel, the ball within the bucket is discharged into the upper inclined track 19 and repeats its cycle of operation.

It is of course understood that the conveyor chain may run continuously without effecting the operation of the clock, its only function being to elevate the balls whenever there is a ball in the lower storage track to be elevated.

By providing a large number of balls, it is possible to store up sufficient energy to operate my clock for a considerable period of time, with the result that as the balls pass through the mechanism, they may be stored at a low point and later elevated in rapid succession to perform their cycle of operation.

It is to be understood that the form of my invention herewith shown and described is to be taken as a preferred example of the same and that various changes relative to the shape, size, material and arrangement of parts may be resorted to without departing from the spirit of the invention, or the scope of the subjoined claims.

Having thus described my invention, I claim:—

1. In a conveyor mechanism of the character described, an inclined track, a plurality of weights positioned on said inclined track and adapted to roll thereover, means for periodically and independently advancing said weights, a plurality of arms radially positioned, each of said arms having a cup formed thereon and adapted to receive one of said weights in each of said cups during their downward movement, a pivoted cup adapted to receive said weights when it is charged from said cups, said pivoted cup serving to operate said first mentioned weight advancing mechanism for the purpose specified.

2. In a conveyor mechanism, a shaft adapted to be driven, said shaft carrying a plurality of arms secured thereto, a cup positioned on each of said arms, an inclined track positioned above said arms and adapted to support a plurality of weights, said weights being capable of rolling on said track, means for discharging said weights independently into said cups, a pivoted cup adapted to receive said weights from said first mentioned cups and means for returning said weights to said inclined track.

3. In a conveyor mechanism, an elevated inclined track, a shaft positioned beneath said track and adapted to be driven, a plurality of arms radially secured to said shaft, a cup secured on each of said arms, an inclined track positioned beneath said shaft, a plurality of weights positioned on said first mentioned inclined track, means for independently discharging said weight from said first mentioned inclined track to said cup, means for independently receiving said weights from said cups and delivering said weights to said second mentioned inclined track, said weight receiving means serving to operate said first mentioned weight discharging means, means for returning said weights from said second mentioned inclined track to said first inclined track, said means comprising a conveyor chain, a bucket positioned on said chain, means adapted to actuate said chain and means controlled by said chain for independently elevating said weights in the manner described.

In testimony whereof I affix my signature.

FRANK PERRETTI.